US012211640B2

(12) United States Patent
Maeda

(10) Patent No.: US 12,211,640 B2
(45) Date of Patent: Jan. 28, 2025

(54) MULTI-PHASE TRANSFORMER

(71) Applicant: FANUC CORPORATION, Yamanashi (JP)

(72) Inventor: Takuya Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 426 days.

(21) Appl. No.: 17/564,846

(22) Filed: Dec. 29, 2021

(65) Prior Publication Data

US 2022/0122767 A1 Apr. 21, 2022

Related U.S. Application Data

(63) Continuation of application No. 15/845,089, filed on Dec. 18, 2017, now abandoned.

(30) Foreign Application Priority Data

Dec. 21, 2016 (JP) ................................ 2016-248239

(51) Int. Cl.
*H01F 30/12* (2006.01)
*H01F 27/04* (2006.01)
*H01F 27/28* (2006.01)
*H01F 29/02* (2006.01)
*H01F 29/14* (2006.01)

(52) U.S. Cl.
CPC ............. *H01F 30/12* (2013.01); *H01F 27/04* (2013.01); *H01F 27/28* (2013.01); *H01F 29/02* (2013.01); *H01F 29/14* (2013.01)

(58) Field of Classification Search
CPC .......... H01F 30/12; H01F 27/04; H01F 27/28; H01F 29/02; H01F 29/24; H01F 27/24; H01F 38/18
USPC ....................................................... 336/10, 5
See application file for complete search history.

(56) References Cited

U.S. PATENT DOCUMENTS

| | | | |
|---|---|---|---|
| 2,442,751 | A | 6/1948 | Abbott |
| 3,014,988 | A | 12/1961 | Mccreary |
| 3,439,117 | A | 4/1969 | Shukla et al. |
| 3,539,847 | A | 11/1970 | Gifford |
| 3,750,070 | A | 7/1973 | Rissinger |
| 3,753,189 | A | 8/1973 | Allen |
| 3,758,850 | A | 9/1973 | Snyder |
| 3,802,066 | A | 4/1974 | Barrett |

(Continued)

FOREIGN PATENT DOCUMENTS

| | | | |
|---|---|---|---|
| CN | 201562576 U | 8/2010 | |
| CN | 102881412 A | 1/2013 | |

(Continued)

OTHER PUBLICATIONS

English Abstract and Machine Translation for German Publication No. 102016122564 A1, published Jun. 1, 2017, 12 pgs.

(Continued)

*Primary Examiner* — Shawki S Ismail
*Assistant Examiner* — Joselito S. Baisa
(74) *Attorney, Agent, or Firm* — Fredrikson & Byron, P.A.

(57) ABSTRACT

A multi-phase transformer includes a centrally-disposed first core, a plurality of second cores each provided outside the first core so as to constitute a loop-shaped magnetic path with respect to the first core, and a primary winding and a secondary winding wound on each of the second cores.

14 Claims, 15 Drawing Sheets

(56) References Cited

U.S. PATENT DOCUMENTS

| | | | | |
|---|---|---|---|---|
| 4,234,862 | A | 11/1980 | Prevotat | |
| 4,344,126 | A | 8/1982 | Schumacher | |
| 4,488,136 | A * | 12/1984 | Hansen | H01F 27/24 336/215 |
| 4,803,425 | A | 2/1989 | Swanberg | |
| 4,967,464 | A | 11/1990 | Stephens | |
| 4,975,670 | A | 12/1990 | Krinickas, Jr. | |
| 5,240,382 | A * | 8/1993 | Bessho | H02K 44/06 310/11 |
| 5,532,089 | A | 7/1996 | Adair et al. | |
| 5,705,874 | A | 1/1998 | Grudl | |
| 5,992,741 | A | 11/1999 | Robertson et al. | |
| 6,365,996 | B2 | 4/2002 | Schob | |
| 6,512,437 | B2 | 1/2003 | Jin et al. | |
| 6,794,776 | B1 * | 9/2004 | Gabrys | H02K 7/025 310/90.5 |
| 6,909,352 | B2 | 6/2005 | Hobson et al. | |
| 7,235,910 | B2 | 6/2007 | Decristofaro et al. | |
| 7,332,992 | B2 | 2/2008 | Iwai | |
| 7,449,799 | B2 | 11/2008 | Levin et al. | |
| 7,489,225 | B2 | 2/2009 | Dadafshar | |
| 7,554,431 | B2 | 6/2009 | Dahlgren et al. | |
| 7,656,265 | B2 | 2/2010 | Catalano et al. | |
| 7,779,705 | B2 | 8/2010 | Mastinu et al. | |
| 8,022,586 | B2 | 9/2011 | Holtzapple et al. | |
| 9,799,440 | B2 | 10/2017 | Inoue et al. | |
| 10,586,643 | B2 | 3/2020 | Sakai et al. | |
| 2003/0088967 | A1 | 5/2003 | Hobson et al. | |
| 2003/0206087 | A1 | 11/2003 | Raff | |
| 2005/0162802 | A1 | 7/2005 | Kho et al. | |
| 2005/0237146 | A1 | 10/2005 | Hirzel | |
| 2006/0271155 | A1 | 11/2006 | Herr et al. | |
| 2006/0279155 | A1 | 12/2006 | Holtzapple et al. | |
| 2009/0261939 | A1 | 10/2009 | Shudarek | |
| 2012/0098631 | A1 | 4/2012 | Ono | |
| 2013/0187741 | A1 | 7/2013 | Goodrich et al. | |
| 2014/0288352 | A1 | 9/2014 | Yanai et al. | |
| 2017/0104402 | A1 | 4/2017 | Dai et al. | |
| 2017/0221628 | A1 | 8/2017 | Shirouzu et al. | |
| 2018/0182529 | A1 | 6/2018 | Shirouzu et al. | |
| 2018/0204667 | A1 * | 7/2018 | Tsukada | H01F 27/33 |
| 2019/0267179 | A1 * | 8/2019 | Kobayashi | H01F 27/263 |
| 2019/0295768 | A1 | 9/2019 | Kobayashi | |
| 2020/0286670 | A1 * | 9/2020 | Sigamani | H01F 27/28 |

FOREIGN PATENT DOCUMENTS

| | | | |
|---|---|---|---|
| DE | 102016122564 | A1 | 6/2017 |
| JP | 160514 | U | 4/1989 |
| JP | 3285309 | A | 12/1991 |
| JP | 2008177500 | A | 7/2008 |
| JP | 2010252539 | A | 11/2010 |
| JP | 201161984 | A1 | 4/2013 |
| JP | 2015032814 | A | 2/2015 |
| JP | 201758905 | A | 3/2017 |

OTHER PUBLICATIONS

English Abstract and Machine Translation for Japanese Publication No. 2017-059805 A, published Mar. 23, 2017, 20 pgs.

English Abstract and Machine Translation for Japanese Publication No. 2015-032814 A, published Feb. 16, 2015, 15 pgs.

English Abstract and Machine Translation for Japanese Publication No. JPWO2011061984 A1, published Apr. 4, 2013, 19 pgs.

English Abstract and Machine Translation for Japanese Publication No. 2010-252529 A, published Nov. 4, 2010, 18 pgs.

English Abstract and Machine Translation for Japanese Publication No. 2008-177500 A, published Jul. 31, 2008, 15 pgs.

English Abstract and Machine Translation for Chinese Publication No. 201562576 U, published Aug. 25, 2010, 4 pgs.

English Abstract and Machine Translation for Chinese Publication No. 102881412 A, published Jan. 16, 2013, 7 pgs.

English Abstract and Machine Translation for Japanese Publication No. 03-285309 A, published Dec. 16, 1991, 10 pgs.

English Abstract and Machine Translation for Japanese Publication No. JPH01-060514 U1, published Apr. 17, 1989, 4 pgs.

Untranslated Decision to Grant a Patent mailed by Japan Patent Office (JPO) for Application No. JP 2016-248239, Aug. 28, 2018, 3 pages.

English machine translation of Decision to Grant a Patent mailed by Japan Patent Office (JPO) for Application No. JP 2016-248239, Aug. 28, 2018, 3 pages.

Untranslated Notification of Reasons for Refusal mailed by Japan Patent Office (JPO) for Application No. JP 2016-248239, Apr. 17, 2018, 4 pages.

Translated Notification of Reasons for Refusal mailed by Japan Patent Office (JPO) for Application No. JP 2016-248239, Apr. 17, 2018, 4 pages.

* cited by examiner

PRIOR ART

PRIOR ART

PRIOR ART

MULTI-PHASE TRANSFORMER

This is a continuation of U.S. patent application Ser. No. 15/845,089, filed on Dec. 18, 2017, which claims priority to JP 2016-248239 filed on Dec. 21, 2016, the contents of which are incorporated herein by reference.

BACKGROUND OF THE INVENTION

1. Field of the Invention

The present invention relates to a multi-phase transformer, and specifically relates to a multi-phase transformer having no imbalance in magnetic resistance.

2. Description of Related Art

Conventionally, three-phase transformers in which three cores (winding cores) each having a winding wound thereon are arranged between an upper core and a lower core in a cross direction relative to the lower core are generally known. For example, as shown in FIG. 12, a three-phase transformer is linearly symmetrical with respect to a center line L1-L1 of a middle winding core 102. There are also reported variable transformers having variable reactances (for example, Japanese Unexamined Patent Publication (Kokai) No. 2008-177500, hereinafter referred to as "Patent Document 1", and Japanese Unexamined Patent Publication (Kokai) Nos. 2015-32814 and 3-285309).

A conventional three-phase transformer is constituted of three pairs of primary and secondary windings. One of the three pairs of primary and second windings and a core are disposed approximately in a linearly symmetrical center line, and the remaining two pairs of primary and secondary windings and cores are disposed linearly symmetrically with respect to the center line.

As a result, the side cores at both ends are imbalanced in shape with respect to the middle core, and have different magnetic path lengths. Since the cores constitute the main magnetic resistance in the transformer, this causes an imbalance in magnetic resistance in the magnetic circuit.

Transformers generally use electromagnetic steel sheets as the material for the cores. The electromagnetic steel sheets are joined at joint portions, depending on the shape and assembly method therefor. If the joint portion has a gap, an air layer is generated. The air layer itself constitutes a large magnetic resistance, and therefore causes an imbalance in magnetic resistance in the joint portion.

Directive electromagnetic steel sheets are often used in transformers, and this compounds the problem of joint portions. In other words, the use of the directive electromagnetic steel sheets causes a problem in manufacturing, and more specifically, makes it difficult to assemble a magnetic circuit at joint portions. When no load is connected to the secondary windings, as an ideal transformer, magnetizing current flows from the power supply into the primary windings. In addition to alternating magnetic flux, similar to that generated by an electromagnet, alternating voltage occurs and balances with the voltage of the power supply. Since there are three phases, the values of the magnetizing current, the magnetic flux and the voltage are preferably equal between the three phases. In this regard, it is necessary to achieve balance between the magnetic resistance of the electromagnetic steel sheets, etc., of the phases. When loads are connected to the secondary windings, the north pole of the magnetic flux generated by the primary winding is opposed to the north pole of the magnetic flux generated by the secondary winding. Also in this case, balance is required as with above.

It is difficult to eliminate the formation of magnetic resistance in the joint portions of electromagnetic steel sheets and an imbalance in magnetic resistance caused by the unevenness of the magnetic path lengths owing to shape. In the three-phase electromagnetic equipment described in Patent Document 1 (variable transformer, refer specifically to FIG. 7 and paragraph [0022]), three-phase winding cores are connected using an iron core, and control windings are disposed in the joint portions to control the magnetic flux of the joint portions using current. In other words, the joint portions are formed between the phases, and the magnetic flux of the control windings flows through the joint portions in order to perform control, while magnetic flux flows from one phase to another phase.

FIG. 14 shows a conventional three-phase transformer. In FIG. 14, the control windings are removed from three-phase electromagnetic equipment described in Patent Document 1. FIG. 15 is a drawing of lines of magnetic flux and FIG. 16 is a drawing of magnetic flux density when magnetizing current flows through the conventional three-phase transformer. In FIGS. 14 to 16, which are plan views of the three-phase transformer, a U-phase winding core 1001, a V-phase winding core 1002 and a W-phase winding core 1003 are disposed around a central core 1004. Joint portions (1012, 1023 and 1031) are provided between the winding cores. In the examples of FIGS. 14 to 16, it is known that the provision of the joint portions causes magnetic flux to flow from one phase to another phase, even if the control windings are removed. Even though the three-phase transformer appears to have a symmetrical shape, this depends on the paths through which the magnetic flux flows between the phases. From the viewpoint of a magnetic circuit as well, interphase has to be considered. In the transformer described in Patent Document 1, the lengths of the paths through which the magnetic flux flows are not constant in any current phase. This is because, since the magnetic resistance of the transformer depends on the cores, e.g., only the electromagnetic steel sheets, the paths of the magnetic flux do not have much difference irrespective of which path the magnetic flux passes through, as long as the paths are made of the electromagnetic steel sheets. In other words, in FIG. 15, a V-phase magnetic flux may return to the other V-phase winding core, or may flow into an adjoining W-phase winding core.

In the conventional multi-phase transformer, the magnetic resistance is imbalanced in the magnetic circuit.

SUMMARY OF THE INVENTION

Considering the above problems of the conventional art, an object of the present invention is to provide a multi-phase transformer having no imbalance in magnetic resistance in a magnetic circuit.

A multi-phase transformer according to an embodiment includes a centrally-disposed first core, a plurality of second cores each provided outside the first core so as to constitute a loop-shaped magnetic path with respect to the first core, and a primary winding and a secondary winding wound on each of the second cores.

BRIEF DESCRIPTION OF THE DRAWINGS

The objects, features, and advantages of the present invention will become more apparent from the following detailed description of embodiments, along with the accompanying drawings. In the accompanying drawings.

DETAILED DESCRIPTION OF THE INVENTION

Figure 12:
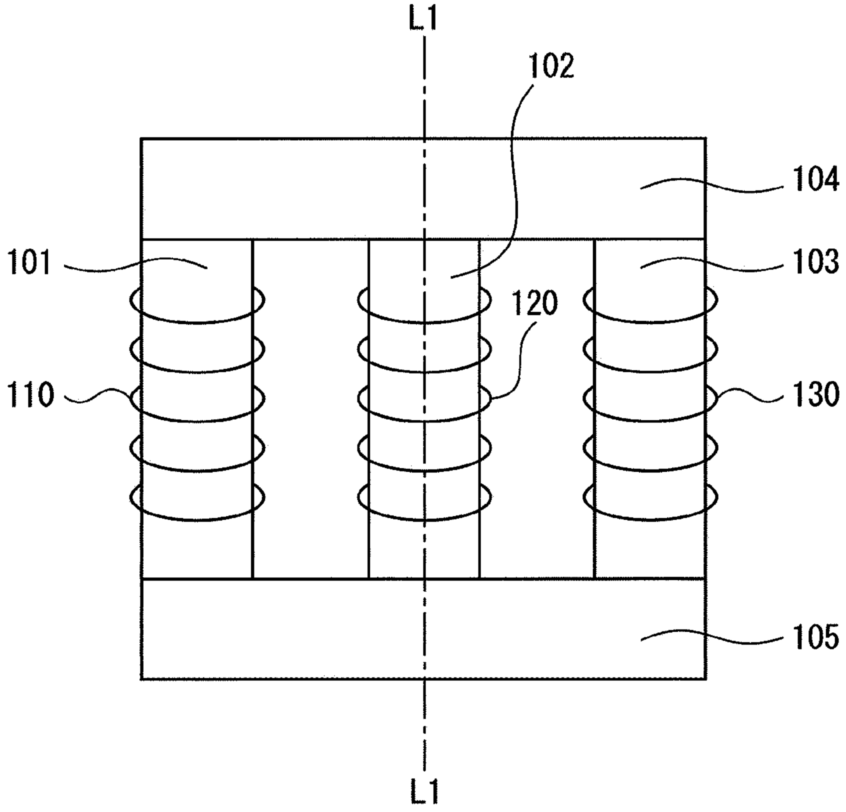
FIG. 12 is a drawing of an example of a conventional multi-phase transformer.

Before describing embodiments of a multi-phase transformer, an example of a conventional multi-phase transformer and problems thereof will be described with reference to FIG. 12. FIG. 12 shows an example of a three-phase transformer.

As shown in FIG. 12, a multi-phase transformer includes an upper core 104, a lower core 105 and three winding cores 101 to 103 on which R-phase, S-phase and T-phase windings 110 to 130 are wound, respectively.

The winding cores 101 to 103 are each disposed between the upper core 104 and the lower core 105. For example, the winding 110 is wound on the R-phase winding core 101. The winding 120 is wound on the S-phase winding core 102. The winding 130 is wound on the T-phase winding core 103.

To equalize inductance between the R-phase, the S-phase and the T-phase, for example, the winding cores 101 to 103 are made of the same material and have the same shape and thickness. The winding cores 101 to 103 are arranged at equal intervals. Moreover, the windings 110 to 130 have the same number of windings. The wires of the windings 110 to 130 are made of the same material and have the same thickness, etc.

In other words, in a side view as shown in FIG. 12, the winding cores 101 to 103 on which the windings 110 to 130 are wound are linearly symmetrical with respect to line L1-L1 that passes through the center of the middle winding core 102 in the vertical direction.

However, in the three-phase transformer that is linearly symmetrical with respect to line L1-L1, as shown in FIG. 12, an imbalance occurs between the middle winding core 102 (winding 120) and each of the side winding cores 101 and 103 (windings 110 and 130). Since the cores constitute the main magnetic resistance in the transformer, this causes an imbalance in magnetic resistance in the R-phase, S-phase and T-phase magnetic circuit.

Embodiments of a multi-phase transformer will be described below in detail with reference to the accompanying drawings. Note that, the following description takes a three-phase transformer as an example, but is not limited thereto. The present invention is widely applicable to multi-phase transformers that require balanced magnetic resistance between phases. The multi-phase transformer is applicable to various devices, as well as to industrial robots and machine tools.

Figure 1:
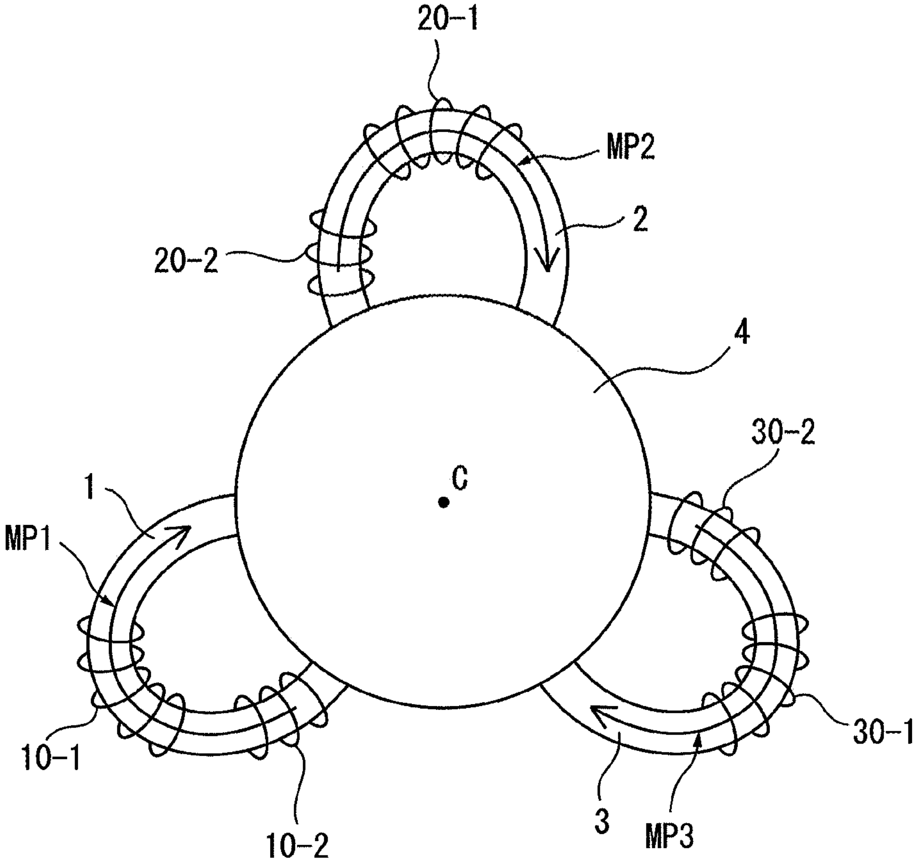
FIG. 1 is a drawing of a multi-phase transformer according to a first embodiment.

FIG. 1 is a drawing of a multi-phase transformer according to a first embodiment, and schematically shows an example of a three-phase transformer to which three-phase alternating current (AC) voltage is applied. In FIG. 1, reference numeral 1 indicates an R-phase winding core (hereinafter referred to as "second core") of the three-phase alternating current (AC) (R-phase, S-phase and T-phase). Reference numeral 2 indicates an S-phase second core, and reference numeral 3 indicates a T-phase second core. Reference numeral 4 indicates a central core (hereinafter referred to as "first core"). The multi-phase transformer according to the first embodiment includes a centrally-disposed first core 4, a plurality of second cores (1, 2 and 3) each disposed outside the first core so as to have a loop-shaped magnetic path (MP1, MP2 or MP3) with respect to the first core, and a primary winding (10-1, 20-1 or 30-1) and a secondary winding (10-2, 20-2 or 30-2) wound on each of the second cores.

Reference numeral 10-1 indicates a primary winding wound on the R-phase second core 1. Reference numeral 10-2 indicates a secondary winding wound on the R-phase second core 1. Reference numeral 20-1 indicates a primary winding wound on the S-phase second core 2. Reference numeral 20-2 indicates a secondary winding wound on the S-phase second core 2. Reference numeral 30-1 indicates a primary winding wound on the T-phase second core 3. Reference numeral 30-2 indicates a secondary winding wound on the T-phase second core 3. In other words, the three-phase (multi-phase) transformer according to the first embodiment includes the centrally-disposed first core 4, the three second cores (1, 2 and 3) disposed outside the first core 4, and the three pairs of windings ([10-1 and 10-2], [20-1 and 20-2], and [30-1 and 30-2]) wound on the three second cores (1, 2 and 3), respectively.

The three second cores (1, 2 and 3) are disposed such that the magnetic paths (MP1, MP2 and MP3) thereof are each in a loop shape, with respect to the first core 4. Assuming the three-phase transformer to be a magnetic circuit, iron for making the iron core and electromagnetic steel sheets constitute the predominant magnetic resistance.

The second cores (1, 2 and 3) preferably have the same shape. The distances between adjoining two of the second cores ([1 and 2], [2 and 3], and [3 and 1]) are preferably equal to each other. In other words, the second cores (1, 2 and 3) are preferably arranged around the first core 4 rotationally symmetrically with respect to the center C of the first core 4. Note that, in view of providing inductance as the transformer, there is no physical problem in making the second cores (1, 2 and 3) of different shapes and in arranging the second cores (1, 2 and 3) rotationally asymmetrically.

Furthermore, the three second cores (1, 2 and 3) are made of the same material (for example, lamination of electromagnetic steel sheets such as silicon steel sheets, etc.). The three pairs of windings ([10-1 and 10-2], [20-1 and 20-2], and [30-1 and 30-2]) are made of wires of the same material and the same thickness so as to have the same number of windings, winding intervals, etc. Note that, the second cores (1, 2 and 3) and the first core 4 may be made from various generally known core materials into various generally known core shapes. Thus, the three second cores (1, 2 and 3) (three pairs of windings ([10-1 and 10-2], [20-1 and 20-2], and [30-1 and 30-2])) are formed to be the same, having the same magnetic resistance. Even when gaps are formed in the three second cores (1, 2 and 3), the three second cores (1, 2 and 3) have the same magnetic resistance in the same manner. As in the case of the second cores (1, 2 and 3), there is no physical problem in making the three pairs of windings ([10-1 and 10-2], [20-1 and 20-2], and [30-1 and 30-2]) have different numbers of windings, etc.

Figure 2:
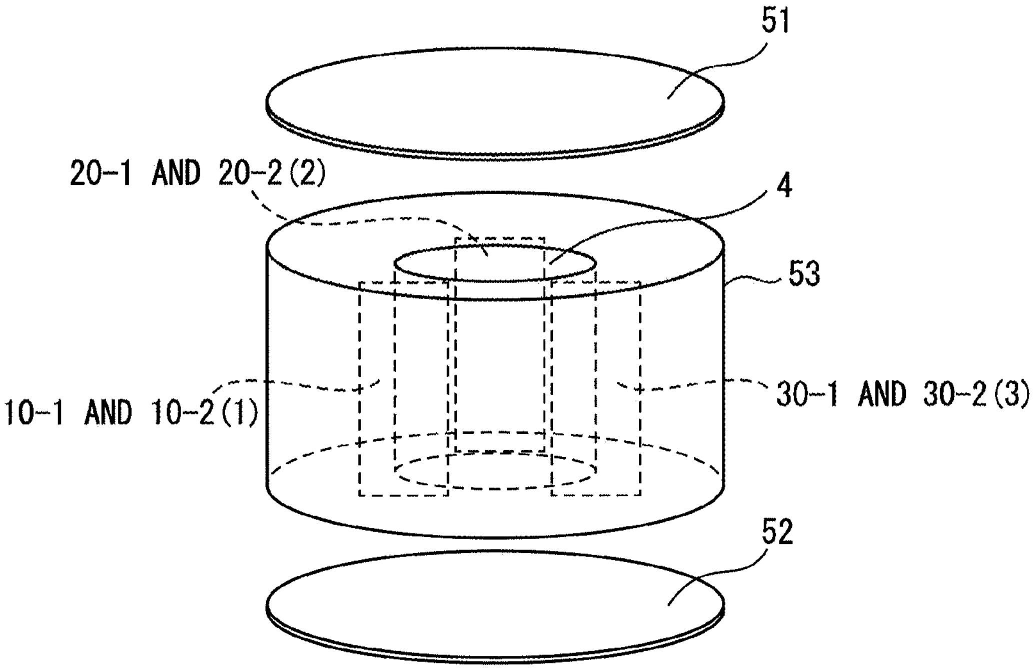
FIG. 2 is a schematic perspective view of the multi-phase transformer of FIG. 1 according to the first embodiment.

FIG. 2 is a schematic perspective view of the multi-phase transformer of FIG. 1 according to the first embodiment, which schematically shows the three-phase transformer of FIG. 1. As shown in FIG. 2, the three-phase transformer having the first core 4 and the three pairs of windings ([10-1 and 10-2], [20-1 and 20-2], and [30-1 and 30-2]) is held by, for example, a top plate 51, a bottom plate 52, and a case 53. The top plate 51, the bottom plate 52, and the case 53 may be provided with members (not shown) for holding and fixing the positional relationship between the first core 4 and the three second cores (1, 2 and 3), slits (not shown) for dissipating heat from the three-phase transformer during use, etc.

In the multi-phase transformer according to the first embodiment, for example, the first core 4 made of a cylindrical iron core is centrally-disposed, and the loop-shaped magnetic paths (MP1, MP2 and MP3), the primary windings (10-1, 20-1 and 30-1) and the secondary windings (10-2, 20-2 and 30-2) are arranged around the first core 4 and connected to the first core 4. Connection portions are provided for the purpose of inserting the windings. Even though ease of insertion of the windings is lost to some extent, the iron core may be structured without using the connection portions at all. The connection portions may be provided in other positions to ease the insertion of the windings. The connection portions may be formed only between the central cylindrical first core 4 and the loop-shaped magnetic path. However, it can be easily understood from the shape that if the connection portions are provided in the loop-shaped magnetic paths, symmetry is maintained. Providing the connection portion in the same position of each loop-shaped magnetic path facilitates inserting the primary winding and the secondary winding, as well as maintaining symmetry. As in the case of a core-type core, magnetic steel sheets of a certain shape are laminated in a lamination direction, so a lamination method of the magnetic steel sheets is easy. For the sake of ease of winding of the windings, the iron core portion is not necessarily made into the cylindrical shape, while being laminated. As to a method for winding the windings, conventional techniques can be used.

Since the multi-phase transformer according to the first embodiment has a symmetrical shape in structure, it is easy to eliminate imbalance in magnetic resistance between the three phases (multi phases). Since the shape is made of only self-inductance, it is possible to eliminate imbalance of the multi-phase transformer. No imbalance in the magnetic resistance eliminates imbalance in voltage, current, magnetic flux, etc., which depend on the transformer. The waveform of the harmonic, such as a third harmonic owing to a hysteresis phenomenon, etc., has no imbalance, and this is effective at connection of three phases, etc.

Figure 3:
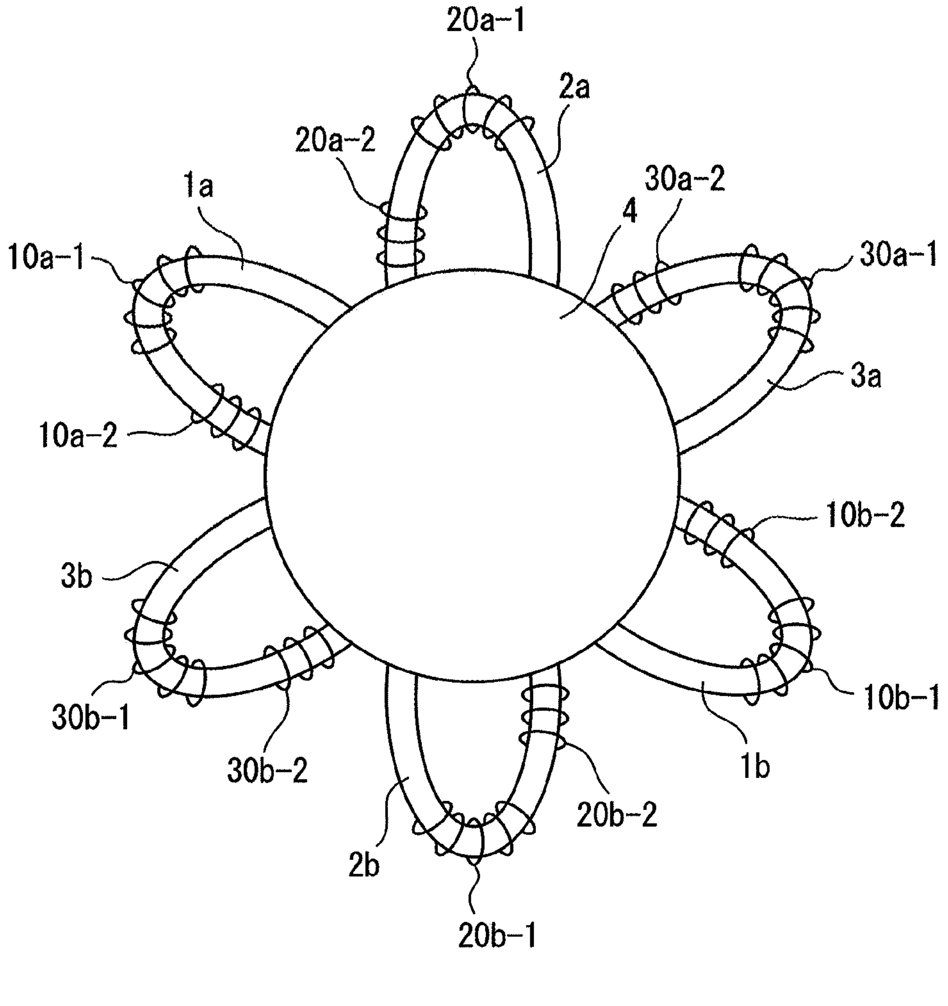
FIG. 3 is a drawing of a multi-phase transformer according to a second embodiment.

FIG. 3 is a drawing of a multi-phase transformer according to a second embodiment, which shows an example of a three-phase transformer including six second cores (1*a*, 2*a*, 3*a*, 1*b*, 2*b* and 3*b*) and six pairs of windings ([10*a*-1 and 10*a*-2], [20*a*-1 and 20*a*-2], [30*a*-1 and 30*a*-2], [10*b*-1 and 10*b*-2], [20*b*-1 and 20*b*-2], and [30*b*-1 and 30*b*-2]) arranged around the first core 4 in a rotationally symmetrical manner.

In other words, as shown in FIG. 3, in the multi-phase transformer according to the second embodiment, for example, two second cores (1*a* and 1*b*), (2*a* and 2*b*), (3*a* and 3*b*) disposed opposite across the first core 4 and windings ([10*a*-1 and 10*a*-2], [10*b*-1 and 10*b*-2]), ([20*a*-1 and 20*a*-2], [20*b*-1 and 20*b*-2]), ([30*a*-1 and 30*a*-2], [30*b*-1 and 30*b*-2]) wound thereon are grouped into three groups corresponding to an R-phase, an S-phase, and a T-phase, to form the three-phase transformer. As a matter of course, in two pairs of windings ([10*a*-1 and 10*a*-2], [10*b*-1 and 10*b*-2]), ([20*a*-1 and 20*a*-2], [20*b*-1 and 20*b*-2]), ([30*a*-1 and 30*a*-2], [30*b*-1 and 30*b*-2]) of each phase, the windings have the same winding direction, connection, etc.

As described above, in the three-phase transformer, for example, an integral multiple of 3 (twice of 3 in FIG. 3) number of second cores are provided, and windings ([10*a*-1 and 10*a*-2], [10*b*-1 and 10*b*-2]), ([20*a*-1 and 20*a*-2], [20*b*-1 and 20*b*-2]), ([30*a*-1 and 30*a*-2], [30*b*-1 and 30*b*-2]) wound on the second cores (1*a*, 2*a*, 3*a*, 1*b*, 2*b* and 3*b*) are grouped into three, i.e., the R-phase, the S-phase, and the T-phase. The multi-phase transformer shown in FIG. 3 may be used as a six-phase transformer by independently using the six windings (10*a*-1, 10*a*-2, 20*a*-2, 20*a*-2, 30*a*-1, 30*a*-2, 10*b*-1, 10*b*-2, 20*b*-1, 20*b*-2, 30*b*-1 and 30*b*-2) as is, without combining the two windings into one.

Figure 4:
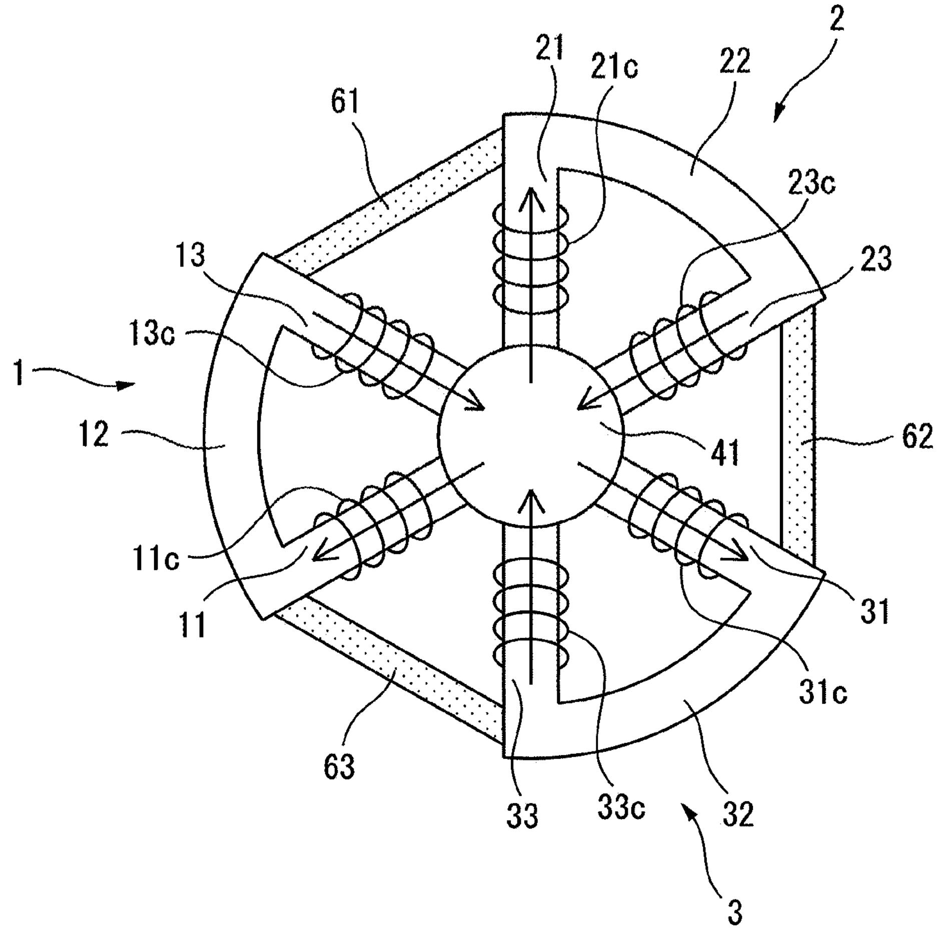
FIG. 4 is a drawing of a multi-phase transformer according to a third embodiment.

FIG. 4 is a drawing of a multi-phase transformer according to a third embodiment, which schematically shows an example of a three-phase transformer. As is apparent from a comparison between FIG. 4 and FIG. 1 described above, in the three-phase transformer according to the third embodiment, each second core (1, 2, or 3) includes two radial leg portions ([11 and 13], [21 and 22], or [31 and 33]) that face the exterior of a round first core 41 at their one ends and extend radially, and an outer peripheral portion (12, 22 or 32) connecting the other ends of the two radial leg portions, which are formed integrally.

An end surface of each of the radial leg portions ([11 and 13], [21 and 22], and [31 and 33]) is in an arc shape corresponding to the exterior of the round first core 41. In other words, the exterior of the first core 41 is round in shape corresponding to the shape of the one ends of the radial leg portions ([11 and 13], [21 and 22], and [31 and 33]) of the second cores (1, 2 and 3).

Non-magnetic core fixation members (61, 62 and 63) are provided between the outer peripheral portions (12, 22 and 32) of the adjoining two second cores (1, 2 and 3). In other words, a core fixation member 61 is provided between the outer peripheral portion 12 of the second core 1 and the outer peripheral portion 22 of the second core 2. A core fixation member 62 is provided between the outer peripheral portion 22 of the second core 2 and the outer peripheral portion 32 of the second core 3. A core fixation member 63 is provided between the outer peripheral portion 32 of the second core 3 and the outer peripheral portion 12 of the second core 1.

Only a part of each of the core fixation members (61, 62 and 63) may be made of a non-magnetic material.

A primary winding 11*c* and a secondary winding 13*c* ([21*c* and 23*c*], and [31*c* and 33*c*]) are wound on the two radial leg portions 11 and 13 ([21 and 23], and [31 and 33]) of the second core 1 (2 and 3), respectively. In the second cores (1, 2 and 3), the windings ([11*c* and 13*c*], [21*c* and 23*c*], and [31*c* and 33*c*]) have the same winding direction, connection, etc. The loop portions constituting magnetic paths are weak in strength, though supporting the windings, and hence may generally cause noise owing to a magnetostriction phenomenon in the transformer. Therefore, providing the support portions constituted of the core fixation members (61, 62 and 63) provides strength to the transformer, thus preventing the noise.

Since the core fixation members (61, 62 and 63) are substantially separated from the magnetic flux of the second cores (1, 2 and 3) on which the windings are wound, as described later in detail with reference to FIG. 11, the core fixation members (61, 62 and 63) are not necessarily made of the same material (e.g., electromagnetic steel sheets) as the second cores, but may be made of plastic, etc. Furthermore, the core fixation members (61, 62 and 63) may be used to secure the three-phase transformer using, for example, predetermined holes (610, 620 and 630) (cf. FIG. 13) formed therein. The core fixation members (61, 62 and 63) may be used to assemble the three-phase transformer or secure the three-phase transformer.

Figure 5:
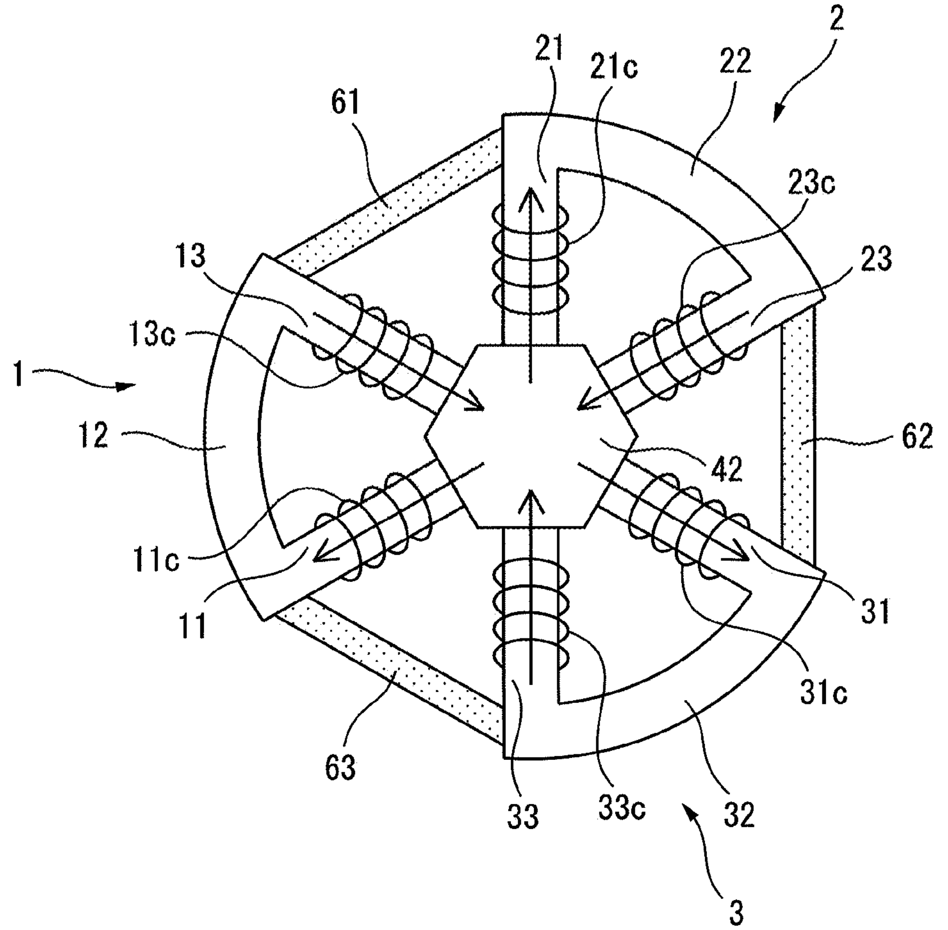
FIG. 5 is a drawing of a multi-phase transformer according to a fourth embodiment.

FIG. 5 is a drawing of a multi-phase transformer according to a fourth embodiment. The difference between the multi-phase transformer according to the fourth embodiment and the above-described multi-phase transformer according to the third embodiment is the shape of the central core (first core). In other words, as shown in FIG. 5, in a three-phase transformer according to the fourth embodiment, the exterior of a first core 42 is in the shape a regular hexagon (irregular hexagon) corresponding to the shape of the one ends of the radial leg portions (11, 13, 21, 23, 31 and 33) of the three second cores (1, 2 and 3). The one end surface of each radial leg portion is linear in shape corresponding to each side of the regular hexagonal first core 42.

Figure 6:
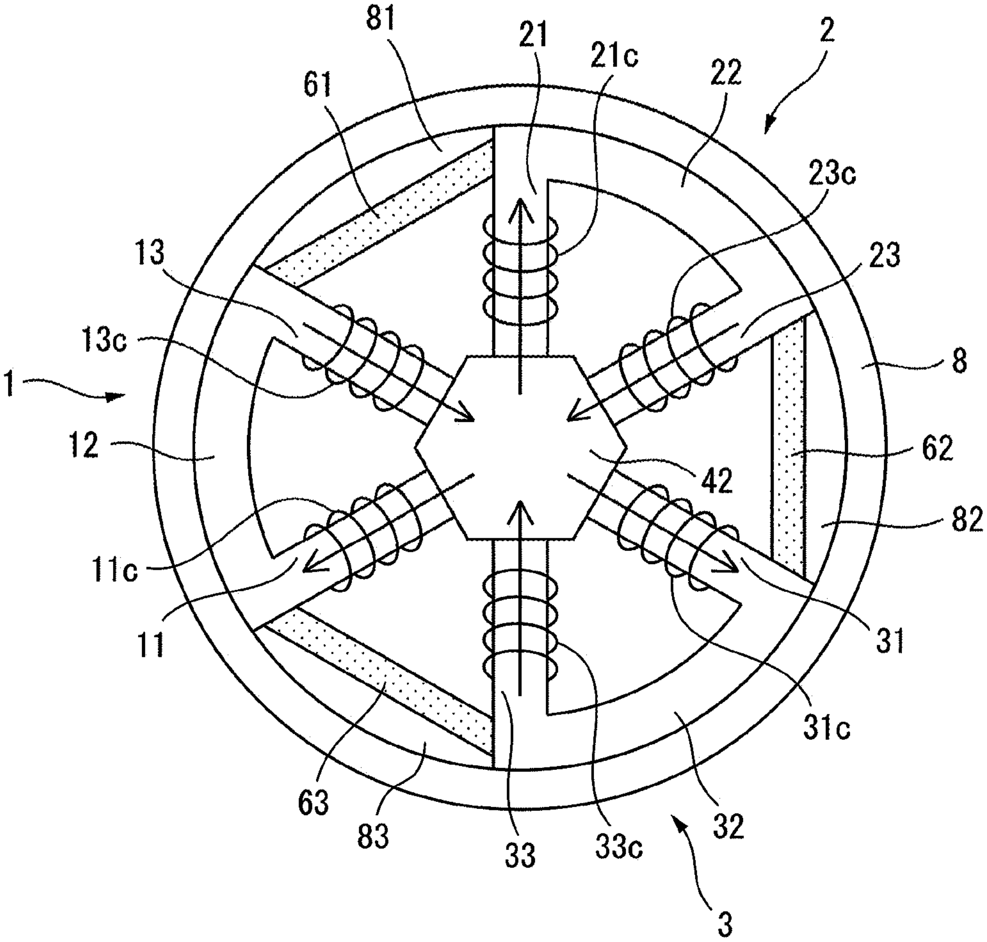
FIG. 6 is a drawing of a multi-phase transformer according to a fifth embodiment.

FIG. 6 is a drawing of a multi-phase transformer according to a fifth embodiment. The difference between the multi-phase transformer according to the fifth embodiment and the above-described multi-phase transformer according to the fourth embodiment is that a round cylindrical structure 8 is formed onto the core fixation members (61, 62 and 63) and the outer peripheral portions of the second cores (1, 2 and 3).

As shown in the multi-phase transformer according to the fifth embodiment, since the non-magnetic cylindrical structure 8 supports the loop-shaped outer peripheral portions (12, 22 and 32) and the core fixation members (61, 62 and 63), the multi-phase transformer becomes strong in structure, thus preventing noise. By enclosing the windings, the windings are easily secured using a resin, an impregnant, etc., and insulating oil is stored therein.

The multi-phase transformer according to the fifth embodiment has no mutual inductance between the primary windings or between the secondary windings with another phase, and has only self-inductances. Therefore, in any phase and any electrical angle, the magnetic path length is constant and has no imbalance. This shape is constituted of only the self-inductances, thus allowing for the provision of a multi-phase transformer having no imbalance.

Note that, gaps (81, 82 or 83) are provided between the cylindrical structure 8 and each of the core fixation members (61, 62 and 63) of FIG. 6 in the multi-phase transformer according to the fifth embodiment, but no gap may be provided. Furthermore, predetermined holes (not shown) may be formed in the cylindrical structure 8 to secure the three-phase transformer.

Figure 7:
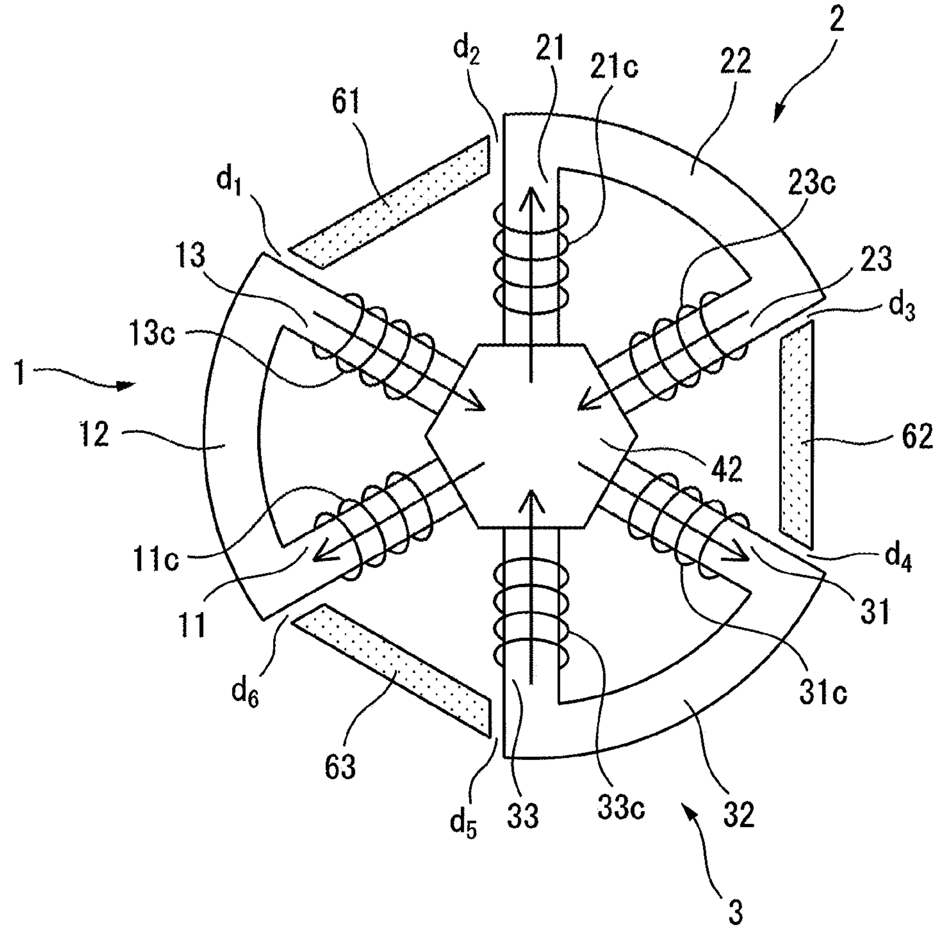
FIG. 7 is a drawing of a multi-phase transformer according to a sixth embodiment.

FIG. 7 is a drawing of a multi-phase transformer according to a sixth embodiment. The difference between the multi-phase transformer according to the sixth embodiment and the above-described multi-phase transformer according to the fourth embodiment is that gaps $d_1$ to $d_6$ are each formed between the core fixation member (61, 62 or 63) and the radial leg portion (11, 13, 21, 23, 31 or 33). More specifically, as shown in FIG. 7, a gap $d_1$ is formed between the radial leg portion 13 and the core fixation member 61. A gap $d_2$ is formed between the radial leg portion 21 and the core fixation member 61. A gap $d_3$ is formed between the radial leg portion 23 and the core fixation member 62. A gap $d_4$ is formed between the radial leg portion 31 and the core fixation member 62. A gap $d_5$ is formed between the radial leg portion 33 and the core fixation member 63. A gap $d_6$ is formed between the radial leg portion 11 and the core fixation member 63. The provided gaps, which are made of a non-magnetic material, have large magnetic resistances and do not constitute paths for magnetic flux. The gaps may be made of another non-magnetic material, such as plastic or air.

Figure 8:
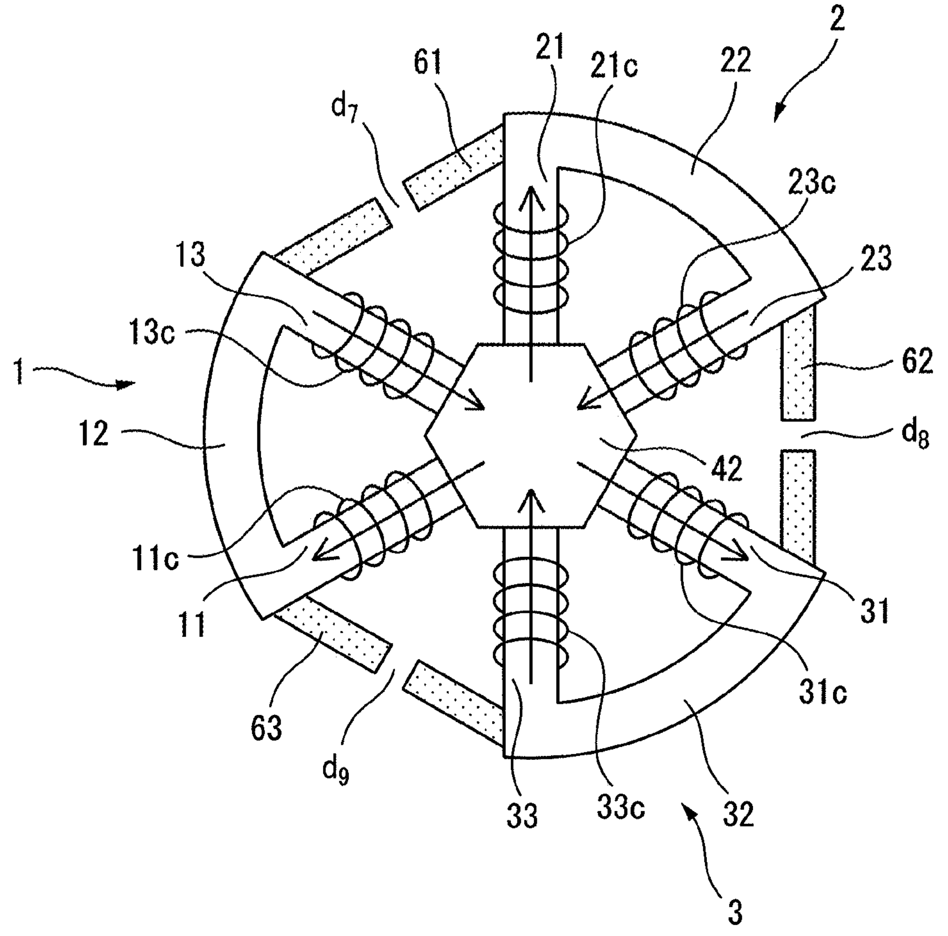
FIG. 8 is a drawing of a multi-phase transformer according to a seventh embodiment.

FIG. 8 is a drawing of a multi-phase transformer according to a seventh embodiment. The difference between the multi-phase transformer according to the seventh embodiment and the above-described multi-phase transformer according to the fourth embodiment is that gaps $d_7$ to $d_9$ are formed at approximately the centers of the core fixation members (61, 62 and 63), respectively. More specifically, as shown in FIG. 8, a gap $d_7$ is formed at approximately the center of the core fixation member 61. A gap $d_8$ is formed at approximately the center of the core fixation member 62. A gap $d_9$ is formed approximately at the center of the core fixation member 63. The provided gaps have large magnetic resistances and do not constitute paths for magnetic flux. The gaps may be made of any non-magnetic material, such as plastic or air.

Using the core fixation members (61, 62 and 63), i.e., the support portions made of a magnetic material, and covering the windings with a magnetic material reduces the leak of magnetism, which tends to occur in tripod end legs, and passes magnetic flux through the iron core with high efficiency. Note that, the gaps or low magnetic permeable portions having high magnetic resistance are intentionally provided in order to prevent the support portions from functioning as magnetic paths and to prevent magnetic flux from flowing out. Since the cores are generally formed from a plate material, such as a hoop material, by punching, the core fixation members (61, 62 and 63) are formed concurrently by punching, thus enabling efficient manufacture. Even if the core fixation members are divided, owing to the gaps, the multi-phase transformer can be secured in a depth direction of the drawing, as in the case of the other cores.

Figure 9:
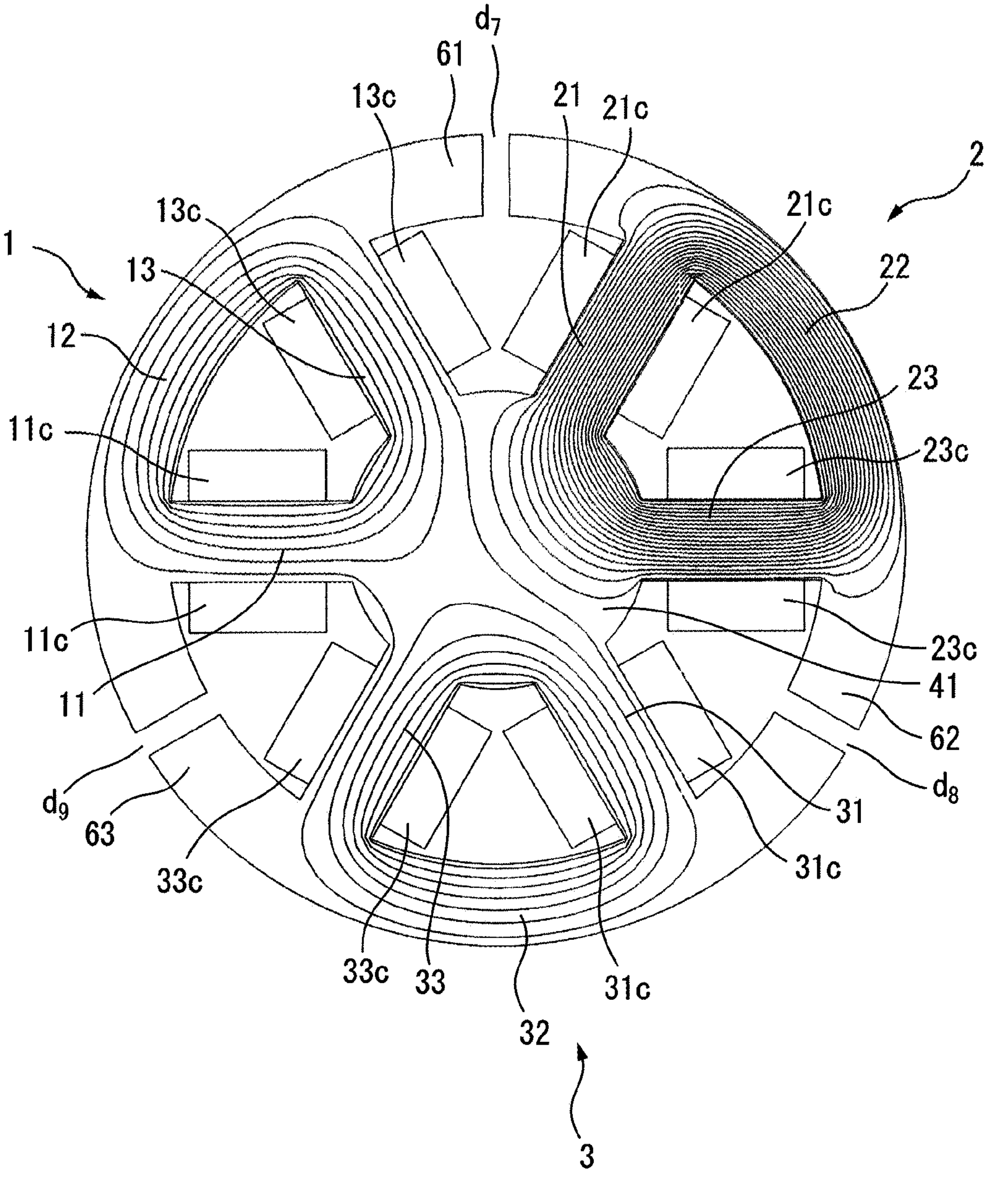
FIG. 9 is a drawing of lines of magnetic flux in the multi-phase transformer according to the seventh embodiment.

FIG. 9 is a drawing of lines of magnetic flux in the multi-phase transformer according to the seventh embodiment. Curved lines illustrated in the core fixation members (61, 62 and 63) and the radial leg portions (11, 13, 21, 23, 31 and 33) represent magnetic flux. When the gaps $d_7$ to $d_9$ are formed at approximately the centers of the core fixation members (61, 62 and 63), no leakage of magnetic flux to another phase is observed and the multi-phase transformer works normally. The gaps may be made of any non-magnetic material, such as plastic or air.

The exterior of the first core 42 may be polygonal in shape corresponding to the shape of the one ends of the radial leg portions (11, 13, 21, 23, 31 and 33) of the second cores (1, 2 and 3). As described above, the first core can take various shapes such as round and polygonal, based on the number of the second cores, the shape of the second cores, etc. Note that, when the first core is made of electromagnetic steel sheets such as silicon steel sheets, for example, the electromagnetic steel sheets of the same shape may be laminated in the thickness direction (e.g., the height direction in FIG. 2), but the first core may be made of a cut core, etc., as long as the same conditions (symmetry) are applied to the second cores.

Figure 10:
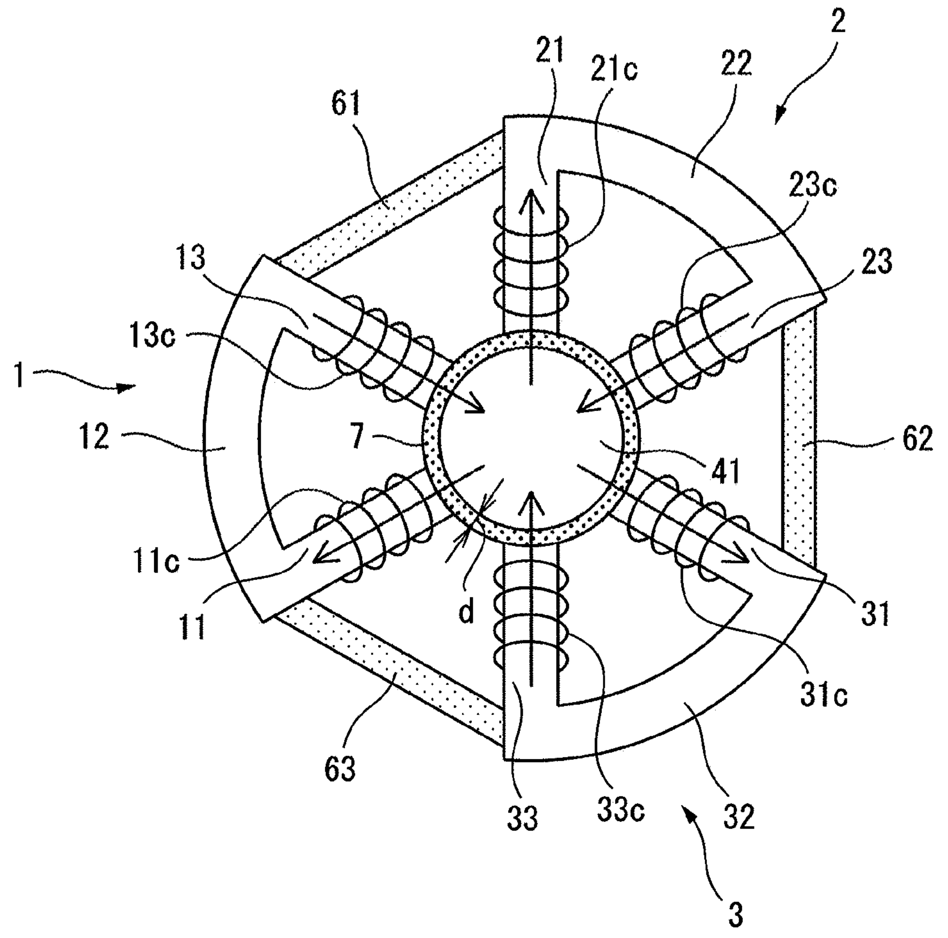
FIG. 10 is a drawing of a multi-phase transformer according to an eighth embodiment.

FIG. 10 is a drawing of a multi-phase transformer according to an eighth embodiment. The difference between the multi-phase transformer according to the eighth embodiment and the multi-phase transformer of FIG. 4 according to the third embodiment is that a spacer 7, which constitutes a magnetic path and has a thickness of d, is provided between the exterior of the first core 41 and the second cores (1, 2 and 3). More specifically, for example, the spacer 7 is in the shape of a cylinder having a thickness of d so as to cover the exterior of the column-shaped first core 41. One end of the radial leg portions (11, 13, 21, 23, 31 and 33) of the second cores (1, 2 and 3) may tightly contact the exterior of the spacer 7.

For example, when the first core 41 is made by laminating round electromagnetic steel sheets, the spacer 7 holds the laminated round electromagnetic steel sheets. The thickness of the spacer 7 defines the gap d between the first core 41 and each of the second cores (1, 2 and 3). Thus, it is possible to stabilize the characteristics of the transformer, as well as reducing the burden of assembly of the transformer. For the spacer 7, various materials are applicable, such as a magnetic material and a non-magnetic material, including plastic. When the spacer 7 is made of a magnetic material, since the spacer 7 is made of the same material as the first core 41 and the second cores (1, 2 and 3), the transformer has the lowest possible magnetic resistance. When the spacer 7 is made of a non-magnetic material, the spacer 7 constitutes a magnetic resistance. For example, when a direct current (DC) component is overlaid on three-phase alternating current (AC) component, the spacer 7 prevents excessive saturation of the iron core and adjusts the saturation of the iron core owing to magnetizing current of the direct current (DC) component. This structure facilitates equally inserting the magnetic resistances. The spacer is provided between the first core 41 and each of the second cores (1, 2 and 3), but the same effect is obtained if the spacer is provided in another position. Various materials, such as plastic or air, are applicable to the spacer.

Note that, in the third to eighth embodiments shown in FIGS. 4 to 8 and 10, for example, when the core fixation members (61, 62 and 63) are made of a different material from the second cores (1, 2 and 3) such as plastic, holes may be formed in the core fixation members (61, 62 and 63) to assemble or secure the three-phase transformer using the holes.

Figure 13:
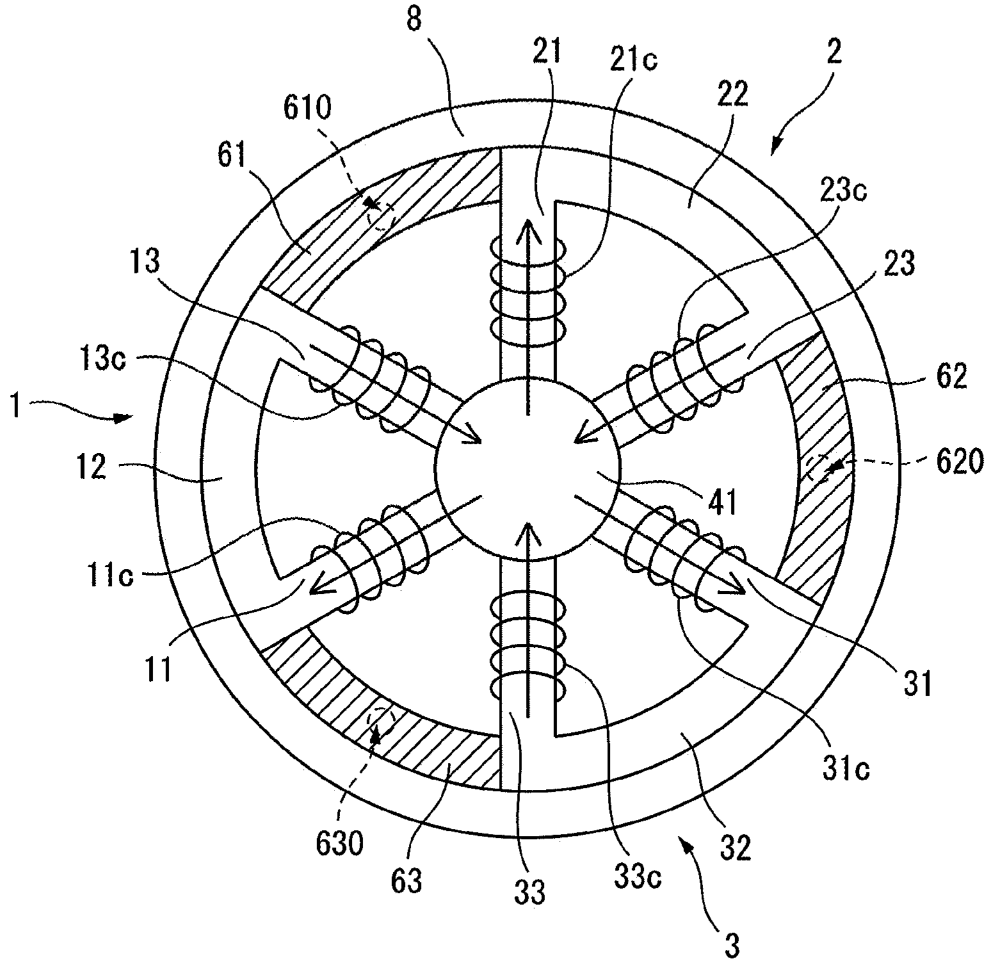
FIG. 13 is a drawing of a multi-phase transformer according to a ninth embodiment.
Figure 14:
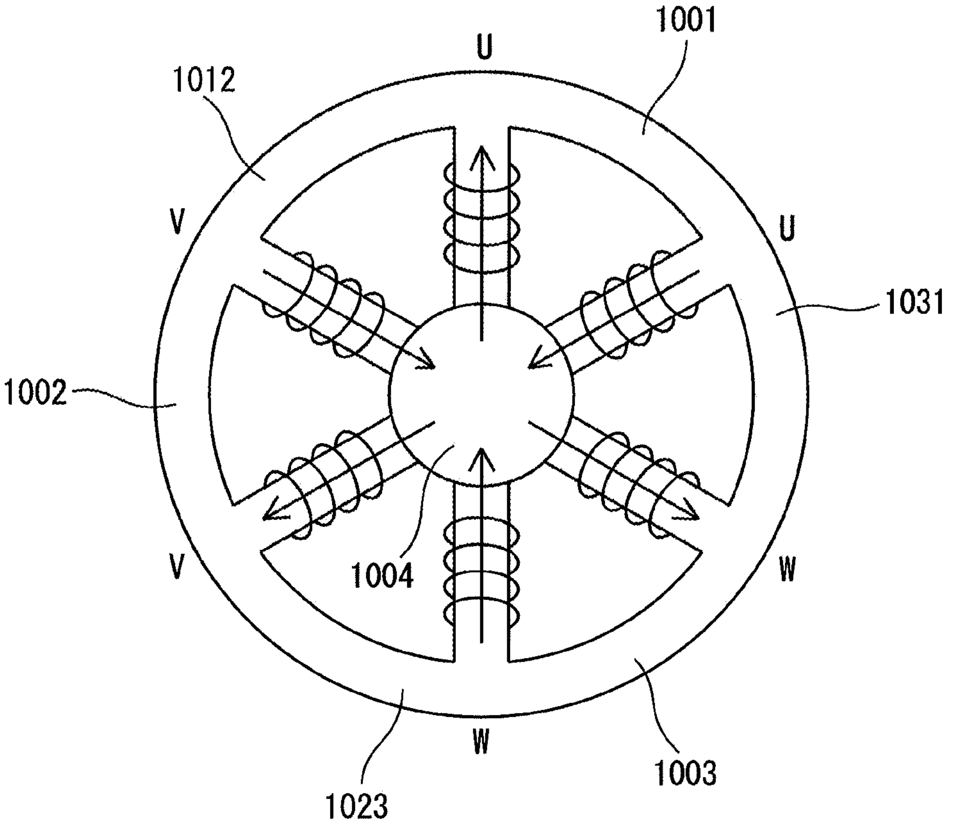
FIG. 14 is a drawing of an example of a conventional three-phase transformer.
Figure 15:
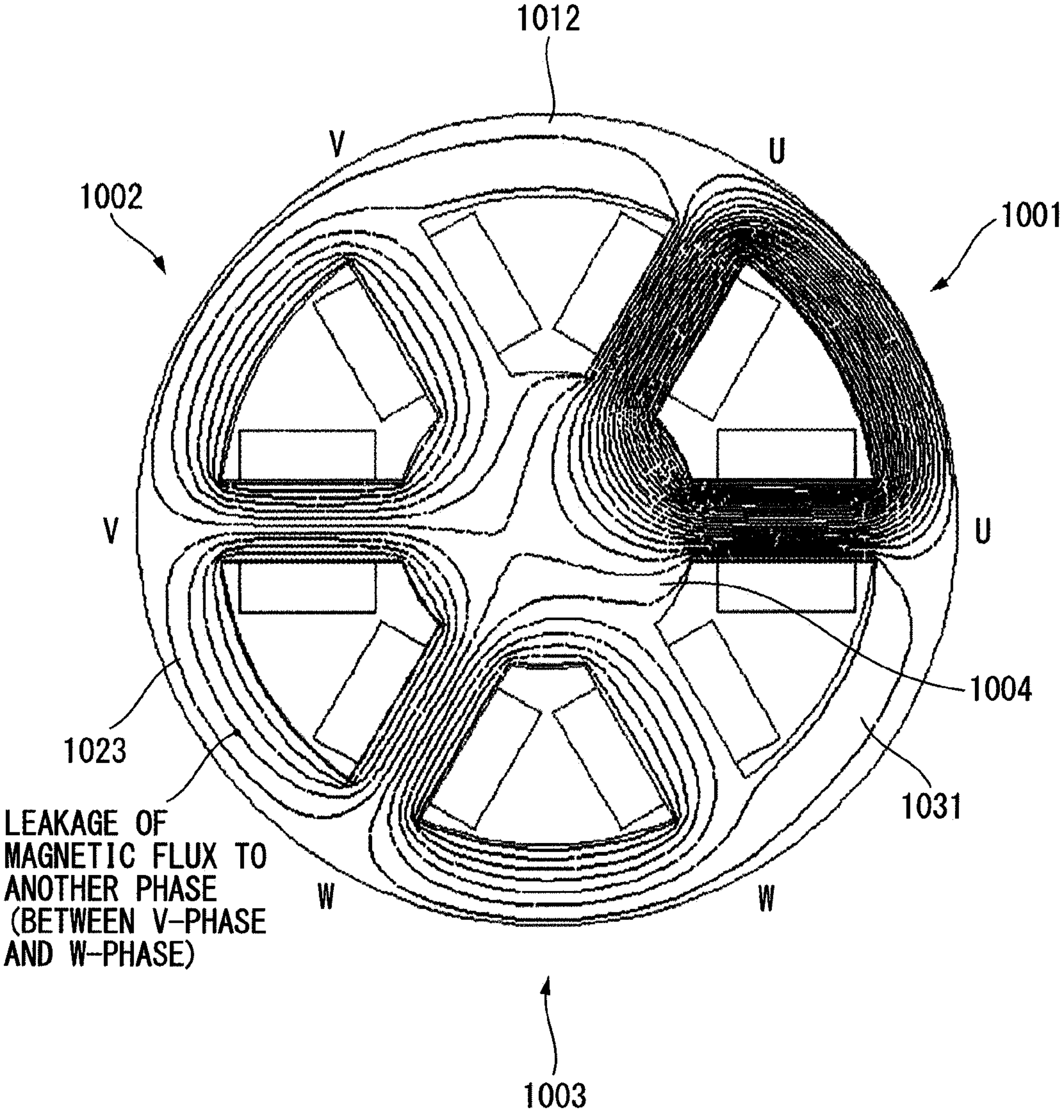
FIG. 15 is a drawing of lines of magnetic flux in the conventional three-phase transformer when magnetizing current flows therethrough.
Figure 16:
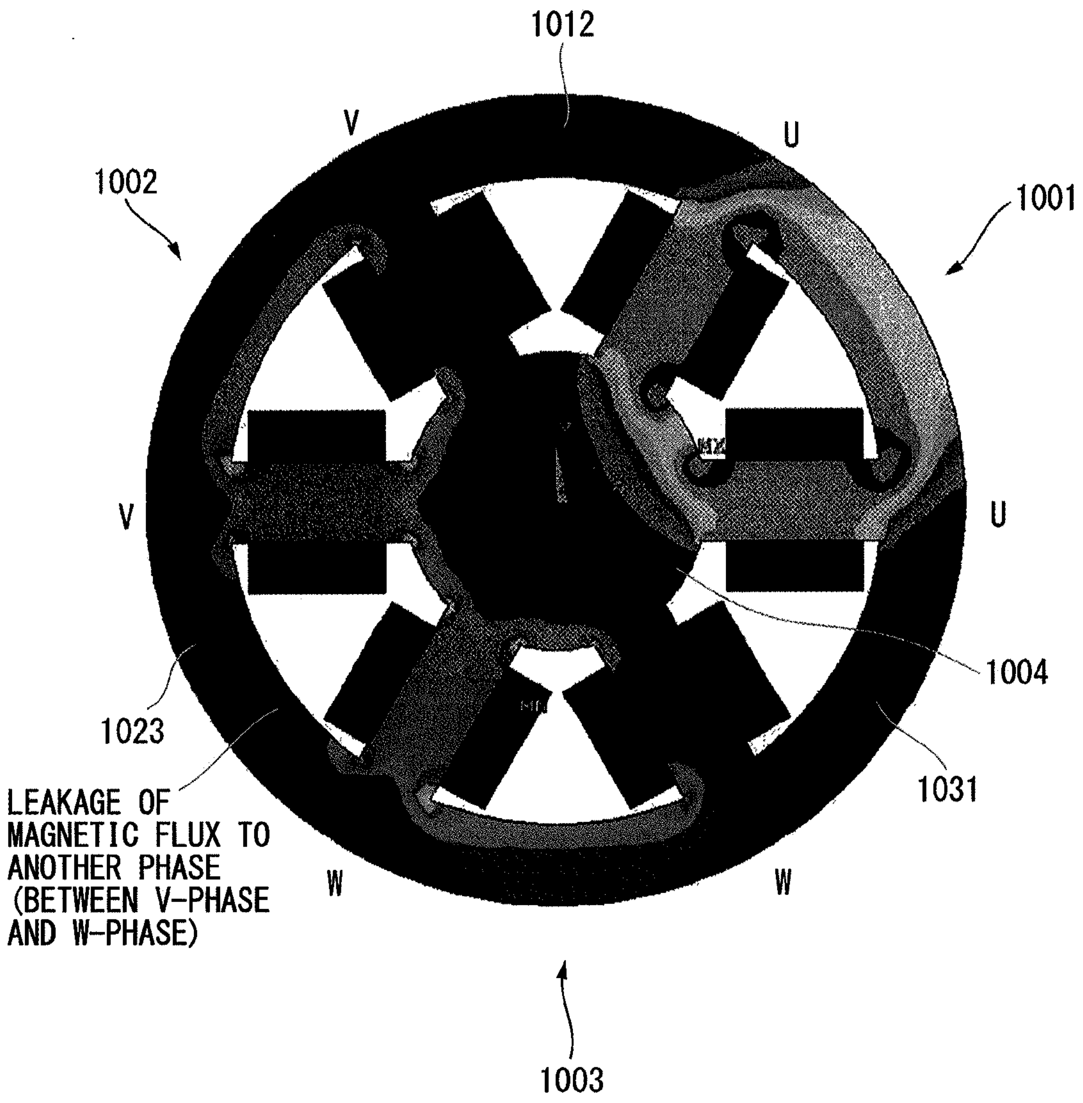
FIG. 16 is a drawing of magnetic flux density in the conventional three-phase transformer when the magnetizing current flows therethrough.

FIG. 13 is a drawing of a multi-phase transformer according to a ninth embodiment. The difference between the multi-phase transformer according to the ninth embodiment and the multi-phase transformer of FIG. 4 according to the third embodiment is that the core fixation members (61, 62 and 63) are formed integrally with the second cores (1, 2 and 3). In the multi-phase transformer according to the ninth embodiment, the cylindrical structure 8 of FIG. 6 in the multi-phase transformer according to the fifth embodiment may be integrally and fixedly fitted onto the core fixation members (61, 62 and 63) and the outer peripheral portions of the second cores (1, 2 and 3). The round cylindrical structure 8 may be made of a non-magnetic material, in the same as the fifth embodiment.

Figure 11:
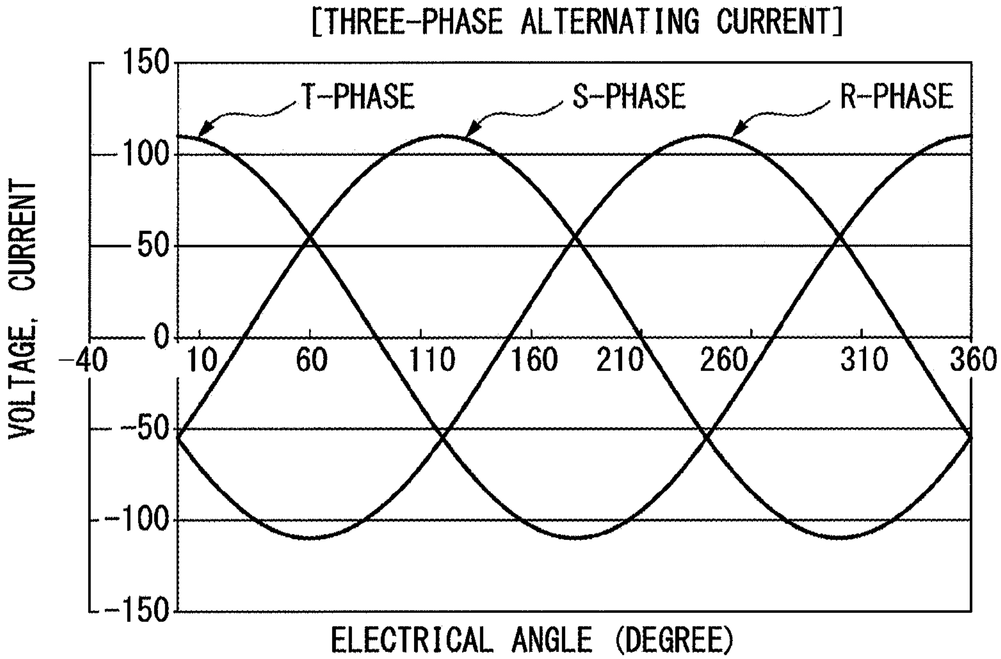
FIG. 11 is a waveform diagram showing an example of three-phase alternating current (AC) voltage and current to be applied to a multi-phase transformer of FIG. 13.

FIG. 11 is a waveform diagram showing an example of three-phase alternating current (AC) voltage and current to be applied to the multi-phase transformer of FIG. 13. In the multi-phase transformer of FIG. 13, both of the outer peripheral portions (12, 22 and 32) and the core fixation members (61, 62 and 63) are round in shape.

As described above with reference to FIG. 4, the windings 11*c* and 13*c* ([21*c* and 23*c*], or [31*c* and 33*c*]) are wound on the two radial leg portions 11 and 13 ([21 and 23], or [31 and 33]) of each second core 1 (2 or 3), respectively, and the windings ([11*c* and 13*c*], [21*c* and 23*c*], or [31*c* and 33*c*]) may have the same winding direction, connection, etc.

The three-phase, i.e., R-phase, S-phase and T-phase alternating current (AC) current 120° out of phase (electrical angle) with each other, as shown in FIG. 11, flows through the windings ([11*c* and 13*c*], [21*c* and 23*c*], and [31*c* and 33*c*]) of the second cores (1, 2 and 3). A magnetic field is generated thereby, as shown in FIG. 9. FIG. 9 is a drawing for explaining the operation of the multi-phase transformer of FIG. 13, and shows lines of magnetic flux when the three-phase alternating current (AC) voltage and current of FIG. 11 is applied to the three-phase transformer of FIG. 13 according to the ninth embodiment.

According to the ninth embodiment shown in FIG. 13, even when, for example, the core fixation members (61, 62 and 63) are formed integrally with the second cores (1, 2 and 3) (using the same material), magnetic flux always does not flow through the core fixation members (61, 62 and 63). Thus, for example, holes (610, 620 and 630) may be formed in the core fixation members (61, 62 and 63), respectively, in order to assemble or secure the three-phase transformer using the holes.

In a small transformer, core portions are easily made from pressed powder cores, etc., into arbitrary shapes, so the shape of this embodiment is easily applicable thereto.

The multi-phase transformers according to the above embodiments may be three-phase transformers to which three-phase alternating current (AC) voltage is applied. Primary windings of the three-phase transformer may be connected by delta connection. Furthermore, the number of second cores may be an integral multiple of 3, and windings wound on the second cores may be grouped into three.

In three-phase transformers, various problems tend to occur on the side of primary windings owing to the third harmonic, and therefore the windings are often connected by delta connection. In addition to the use of the delta connection, the multi-phase transformer according to this embodiment has favorable symmetry and the three-phase third harmonic is less imbalanced, so the occurrence of the problems is further prevented.

In transformers, the width of electromagnetic steel sheets may be varied to form cylindrical legs. In the multi-phase transformers according to the above embodiments, the electromagnetic steel sheets of essentially the same shape are laminated, thus enabling easy manufacturing (each of the laminated electromagnetic steel sheets has the same shape).

Moreover, the above embodiments can be combined in an appropriate manner. For example, the eighth embodiment of FIG. 10 may be applied to the ninth embodiment of FIG. 13, so that the spacer 7 having the thickness of d may be provided on the exterior of the round first core 41. The eighth embodiment of FIG. 10 may be applied to the fourth embodiment of FIG. 5, so that the spacer 7 having the thickness of d may be provided on the exterior of the hexagonal first core 42. As described in detail above, the multi-phase transformers according to the embodiments have magnetic resistances having no imbalance between the phases.

According to the embodiments, it is possible to provide multi-phase transformers having no imbalance in the magnetic resistance in the magnetic circuit.

In the multi-phase transformers according to the above embodiments, all examples and conditions are described for the purpose of easy understanding of the invention and the concept of the invention applied to art, but are not intended to limit the scope of the invention. The description of the application does not indicate the advantages and disadvantages of the invention. The embodiments of the invention are described above in detail, but it is apparent that various modifications, substitutions and deformations can be made without departing from the spirit and scope of the present invention.

What is claimed is:

1. A multi-phase transformer comprising:

a centrally-disposed first core, wherein the first core is non-rotatable;

a plurality of second cores each provided outside the first core so as to constitute a loop-shaped magnetic path with respect to the first core, wherein the first core and the second core are engaged with each other; and a primary winding and a secondary winding wound on each of the second cores, wherein each of the second cores integrally consists essentially of:

two radial leg portions each facing the exterior of the first core at one end and extending radially toward a center point of the multi-phase transformer, wherein the two radial leg portions are non-parallel with each other; and a continuous, unitary outer peripheral portion connecting the other ends of the two radial leg portions in a circumferential direction of the multi-phase transformer, wherein the other end of the one radial leg portion is connected to the one end of the outer peripheral portion in the circumferential direction and the other end of the other radial leg portion is connected to the other end of the outer peripheral portion in the circumferential direction, wherein the primary winding is wound around one of the radial leg portions of a second core and the secondary winding is wound around the other of the corresponding radial leg portions of the same second core as the primary winding; and further comprising a non-magnetic linear core fixation member provided between the outer peripheral portions of the adjoining second cores.

2. The multi-phase transformer according to claim 1, wherein the second cores have the same shape.

3. The multi-phase transformer according to claim 1, wherein the second cores are disposed around the first core rotationally symmetrically with respect to the center of the first core.

4. The multi-phase transformer according to claim 1, wherein a spacer constituting a magnetic path is provided between the exterior of the first core and each of the second cores.

5. The multi-phase transformer according to claim 1, wherein the exterior of the first core is round in shape corresponding to the shape of the one end of the radial leg portions of the second cores.

6. The multi-phase transformer according to claim 1, wherein the exterior of the first core is polygonal in shape corresponding to the shape of the one end of the radial leg portions of the second cores.

7. The multi-phase transformer according to claim 1, wherein only a part of the core fixation member is made of a non-magnetic material.

8. The multi-phase transformer according to claim 1, wherein a round cylindrical structure is formed onto the core fixation member and the outer peripheral portions of the second cores.

9. The multi-phase transformer according to claim 8, wherein the cylindrical structure made of a non-magnetic material is integrally and fixedly fitted onto the core fixation member and the outer peripheral portions of the second cores.

10. The multi-phase transformer according to claim 8, wherein the core fixation member or the cylindrical structure has predetermined holes.

11. The multi-phase transformer according to claim 1, wherein the core fixation member is used to assemble or secure the multi-phase transformer.

12. The multi-phase transformer according to claim 1, wherein the multi-phase transformer is a three-phase transformer to which three-phase alternating current (AC) voltage is applied.

13. The multi-phase transformer according to claim 12, wherein the first windings of the three-phase transformer are connected by delta connection.

14. The multi-phase transformer according to claim 12, wherein the number of the second cores is an integral multiple of 3, and the windings wound on the second cores are grouped into three.

* * * * *